(12) United States Patent
Baba et al.

(10) Patent No.: US 8,313,683 B2
(45) Date of Patent: Nov. 20, 2012

(54) METHOD FOR PRODUCING A MOLDED ARTICLE WITH A LAMINATED STRUCTURE

(75) Inventors: Hideki Baba, Tokyo (JP); Kouji Akasaka, Tokyo (JP); Daiju Kawakami, Tokyo (JP)

(73) Assignee: Moriroku Technology Company, Ltd., Tokyo (JP)

( * ) Notice: Subject to any disclaimer, the term of this patent is extended or adjusted under 35 U.S.C. 154(b) by 0 days.

(21) Appl. No.: 12/368,425

(22) Filed: Feb. 10, 2009

(65) Prior Publication Data

US 2010/0201017 A1  Aug. 12, 2010

(51) Int. Cl.
*B29C 51/00* (2006.01)
(52) U.S. Cl. ......... 264/319; 264/320; 264/327; 264/259
(58) Field of Classification Search ................... None
See application file for complete search history.

(56) References Cited

U.S. PATENT DOCUMENTS

| | | | |
|---|---|---|---|
| 4,248,651 A * | 2/1981 | Kojimoto et al. | 156/198 |
| 5,098,633 A * | 3/1992 | Hausler | 264/511 |
| 6,110,547 A * | 8/2000 | Sano et al. | 428/31 |

FOREIGN PATENT DOCUMENTS

| | | |
|---|---|---|
| JP | 6-115011 A | 4/1994 |
| JP | 7-47630 A | 2/1995 |
| JP | 10-146861 A | 6/1998 |
| JP | 2003-326576 A | 11/2003 |

OTHER PUBLICATIONS

English Machine Translation of JP 2003-326576.*

* cited by examiner

*Primary Examiner* — Monica A Huson
(74) *Attorney, Agent, or Firm* — Leydig, Voit & Mayer, Ltd.

(57) ABSTRACT

A method for manufacturing a plastic laminated article comprising a surface layer of a sheet-like surface member and a synthetic resin backing material layer laminated on the surface layer, without causing a fracture or a reduction in wall thickness of the sheet-like surface member. When the male mold is pressed against the contact area of the sheet-like surface member, the temperature of the contact area of the sheet-like surface member gradually falls due to a thermal gradient between the male mold and the contact area of the sheet-like surface member. Simultaneously, the contact area of the sheet-like surface member is not heated directly. In addition, the direction of jet flow of a hot fluid is changed, by fluid guide surfaces, from the center of the sheet-like surface member to the outer periphery, of the sheet-like surface member. When the temperature of the contact area of the sheet-like surface member falls to a predetermined temperature and the tensile strength of the contact area increases to a predetermined value, the male mold is moved downwardly at a predetermined rate and closed against the female mold.

10 Claims, 10 Drawing Sheets

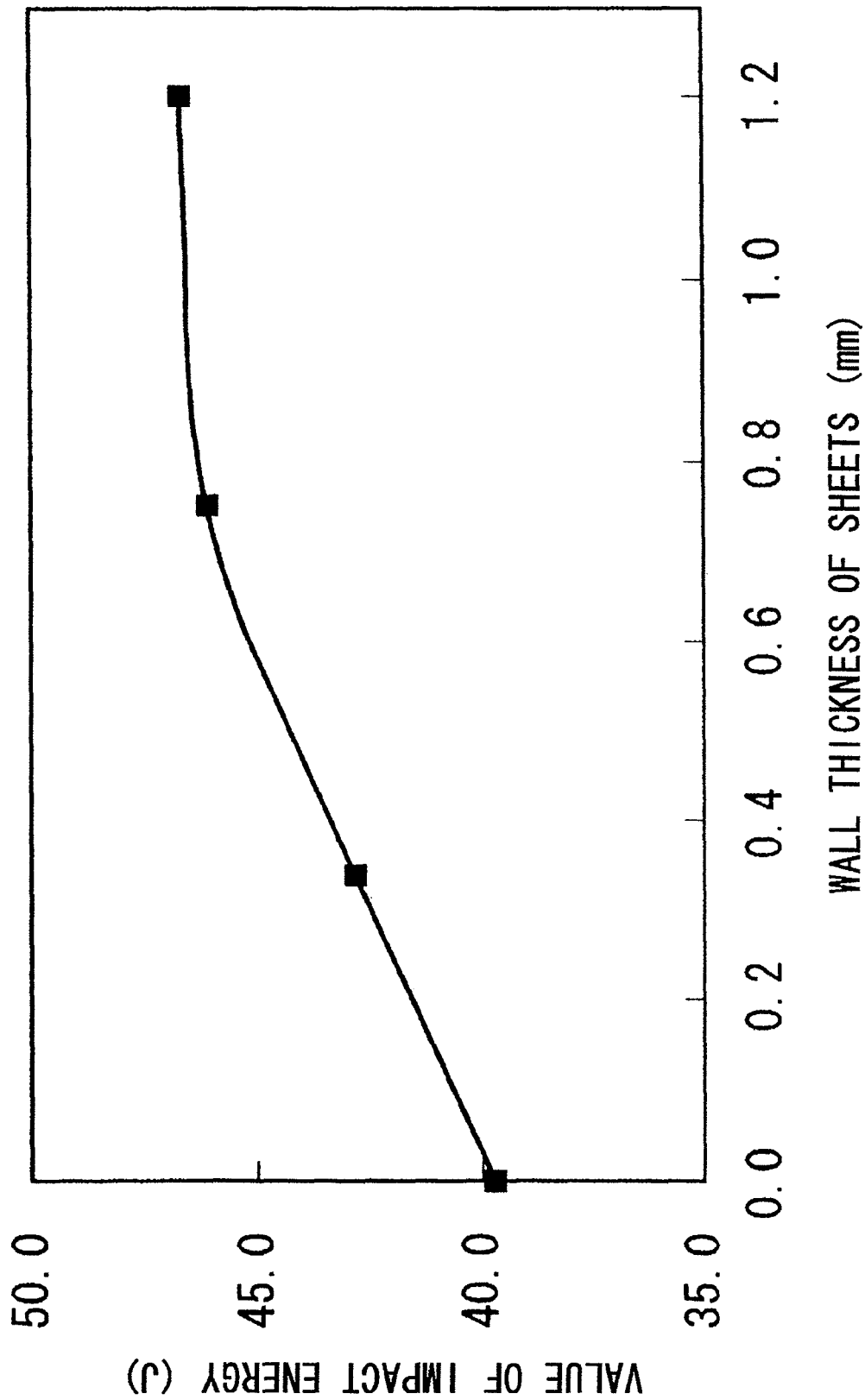

METHOD FOR PRODUCING A MOLDED ARTICLE WITH A LAMINATED STRUCTURE

FIELD OF THE INVENTION

The present invention relates to a method and an apparatus for manufacturing a laminated product of synthetic resin, which is composed of a base member and a surface member. More specifically, the present invention relates to a laminated product of synthetic resin, which is used as engineering products, such as an interior part for vehicles, and a method and an apparatus for manufacturing the laminated product of synthetic resin.

DESCRIPTION OF RELATED ART

An interior part for vehicles, which is composed of a base member and a surface member integrated with the base member, has been used to increase a value of the vehicle with the laminated structure of the base member and the surface member. The base member is to provide appropriate rigidity to the interior part while the surface member is to provide a decorative design and a delightful tactile impression to the interior part. The interior part for vehicles includes a dashboard panel and an instrument panel, to which a variety of equipments and devices are attached. These panels generally include an overhang, which is a so-called meter visor hanging over the equipments and devices attached to the panels. The meter visor is adapted to shadow the equipments and devices by blocking incident light or sunlight and to improve the visibility of the equipments and devices. The meter visor usually comprises a relatively large bulge on a surface of the meter visor. Consequently, a surface member might be stretched excessively when the surface member is molded on a concave surface that is formed in a female mold to mold a bulge of the meter visor. As the stretched surface member becomes thin, the quality of the interior part might be debased by the thin part of the surface member.

Japanese Patent Publication No. H10-146861 discloses method and apparatus for manufacturing a molded product consisting of a base and a skin material integrated with the base. The method and apparatus is characterized in that a sheet of the skin material is gradually stretched in two stages, that is, a stage of preliminary press molding and a subsequent stage of gas pressure molding, and without a process of preheating the sheet of the skin material. Thereby, the sheet of the skin material is protected from breakage even if there is an angular ridgeline in a periphery of a concave portion of the female mold.

Japanese Patent Publication No. 2003-326576 discloses an injection-compression molding method and apparatus for producing a sheet-laminated product. The method and apparatus is characterized by the steps of placing a preheated sheet of surface material between a male die and a female die, and closing a male die against a female die with holding the end edges of the sheet movably. Thereby, the sheet of surface material is prevented from becoming thin in a concave portion of the female die when molding.

Japanese Patent Publication No. H06-115011 discloses a laminated molding product comprising a laminating sheet and a body of a molded object on the surface of which the laminating sheet is disposed. The laminating sheet is composed of a surface layer and a layer of thermoplastic elastomer on which the surface layer is laminated. Since the surface layer is mainly composed of a thermoplastic resin and an elastic-bead or porous inorganic filler, the laminated molding product has a soft skin with a suede finish. In order to enhance the softness of the skin of the laminated molding product, the publication also teaches a layer of synthetic resin foam that should be disposed on the side of the thermoplastic elastomer layer of the laminating sheet.

Japanese Patent Publication No. H07-047630 discloses a multilayered molded product with excellent adhesiveness, which comprises a cushioned skin layer of polyolefin resin foam, a core layer of polyolefin resin, and an adhesive layer of low-melting polyolefin disposed between the cushioned skin layer and the core layer.

When a sheet of skin material is stretched without preheating, as disclosed in Japanese Patent Publication No. H10-146861, it is subjected to cold working in dies. Consequently, the dies must be closed gradually to protect the sheet of skin material from breakage, while the dies can be closed rapidly to shape a preheated sheet of skin material. Furthermore, the sheet of skin material is subjected to cold working in two stages, that is, a stage of preliminary press molding and a subsequent stage of gas pressure molding. Therefore, according to the invention disclosed in Japanese Patent Publication No. H10-146861, it would be difficult to shorten the amount of molding time substantially.

Japanese Patent Publication No. 2003-326576 discloses method and apparatus for injection-compression molding, which includes a step of preheating a laminating sheet before a process of injection-compression molding. A preheated and softened sheet has a possibility of being deflected or deformed when it is arranged between a pair of molds. Furthermore, the closing velocity of the molds must be determined in consideration of decrease in temperature of the preheated sheet, because the temperature of the preheated sheet starts to drop continuously when the preheating process is completed. In addition, the laminating sheet is subjected to a vacuum forming process before the pair of molds are closed up completely. In the vacuum forming process, the laminating sheet is gradually stretched from an upper edge of an inner surface of a recessed area in a female mold toward a suction port for vacuum forming in a bottom of the recessed area, while a portion of the laminating sheet is kept in contact with the inner surface of the recessed area. As a result, the portion of the laminating sheet, which was kept in contact with the inner surface of the recessed area in the female mold during the vacuum forming process, is stretched in smaller amount than the portion of the laminating sheet, which was out of contact with the inner surface of the recessed area in the female mold during the vacuum forming process. In other words, the portion of the laminating sheet, which is in the vicinity of the bottom of the recessed area in the female mold, is thinner than the portion of the laminating sheet, which is in the vicinity of the verge of the opening of the recessed area in the female mold. Consequently, a variety of patterns such as embossed designs and pictures disposed on the laminating sheet might become deformed or sprawled especially in the portion of the laminating sheet located in the vicinity of the bottom of the recessed area in the female mold. As a result, the laminating sheet might become defective in appearance.

Japanese Patent Publication Nos. H06-115011 and H07-047630 disclose laminating sheets consisted of a plurality of layers, respectively. Since many processes are necessary to produce such a plurality of layers as disclosed in the publications, it might be expensive to produce a molded product covered with such a laminating sheet. At the time of hot or cold processing, a multilayered molded product as disclosed in the publications has, in general, a possibility of becoming deformed due to differences in the linear expansion coefficients of the layer materials or a possibility of involving a defect because of internal stress stored in the molded product.

In addition, the laminated molded product disclosed in Japanese Patent Publication No. H06-115011 has multilayer lamination each layer of which is different in material, so that the product cannot be easily recycled.

SUMMARY OF THE INVENTION

The objective of the present invention is to provide a method for producing a laminated molded article having a raised area on the surface of the article, wherein the production efficiency can be increased, the setting for performing the method can be easily changed in accordance with the materials to be processed, and the defects or flawed articles can be reduced.

Another object of the present invention is to provide an apparatus for producing a laminated molded article, wherein the production efficiency can be increased, the setting of the apparatus can be easily changed in accordance with the materials to be processed, the defects or flawed articles can be reduced, and the structure of the apparatus can be simplified.

Further object of the present invention is to provide a laminated article of synthetic resin, wherein the laminated article comprises a laminating sheet of a single-layered structure, and the laminated article has sufficient impact resistance.

The first aspect of the present invention is a method for manufacturing a plastic laminated article having a raised portion on the surface thereof, said method comprising:

a step of arranging and securing a sheet-like surface member of thermoplastic synthetic resin between a die surface of a female mold having a concave portion accommodating an obverse side profile of said raised portion and a die surface of a male mold having a convex portion accommodating a reverse side profile of said raised portion; a step of heating said sheet-like surface member by applying heated fluid such as hot air to said sheet-like surface member that is secured between said die surfaces;

a step of closing said male mold and said female mold while said heated fluid is applied to said sheet-like surface member or after said heated fluid is applied to said sheet-like surface member, whereby said sheet-like surface member is drawn to extend along said die surface of said female mold by said convex portion and the temperature of said sheet-like surface member in the area of contact with said convex portion is kept lower than the temperature of said sheet-like surface member in the area surrounding said area of contact;

a step of carrying out a vacuum forming of said sheet-like surface member against said die surface of said female mold after said molds are closed, whereby said sheet-like surface member is attached firmly to said die surface of said female mold; and a step of injecting a molten resin into a cavity defined between said vacuum-formed sheet-like surface member and said die surface of said male mold, whereby a backing material layer laminated on said sheet-like surface member is formed by said molten resin.

The second aspect of the present invention is a method for manufacturing a plastic laminated article having a raised portion on the surface thereof, said method comprising:

a step of arranging and securing a sheet-like surface member of thermoplastic synthetic resin between a die surface of a female mold having a concave portion accommodating an obverse side profile of said raised portion and a die surface of a male mold having a convex portion accommodating a reverse side profile of said raised portion;

a step of closing said male mold and said female mold after said sheet-like surface member is secured, and heating said sheet-like surface member by applying hot fluid such as hot air to said sheet-like surface member after said convex portion is pressed against the sheet-like surface member, and while said heated fluid is applied to said sheet-like surface member or after said heated fluid is applied to said sheet-like surface member, said sheet-like surface member is drawn to extend along said die surface of said female mold by said convex portion and the temperature of said sheet-like surface member in the area of contact with said convex portion is kept lower than the temperature of said sheet-like surface member in the area surrounding said area of contact;

a step of carrying out a vacuum forming of said sheet-like surface member against said die surface of said female mold after said molds are closed, whereby said sheet-like surface member is attached firmly to said die surface of said female mold; and a step of injecting a molten resin into a cavity defined between said vacuum-formed sheet-like surface member and said die surface of said male mold, whereby a backing material layer laminated on said sheet-like surface member is formed by said molten resin.

The third aspect of the present invention is an apparatus for manufacturing a plastic laminated article, comprising a male mold having a generally convex die surface, a female mold having a generally concave die surface, a cavity defined between said die surfaces when said male mold and said female mold are closed, at least one resin flow channel for injection molding having an opening in said convex die surface, a plurality of vacuum ports for vacuum forming having openings in said concave die surface, clamping devices for securing a sheet-like surface member of thermoplastic synthetic resin between said both die surfaces, and devices for heating said sheet-like surface member, characterized in that said devices for heating said sheet-like surface member comprises nozzles for supplying heated fluid, which is fixed to said female mold and adapted to supply heated fluid such as hot air between said both die surfaces, and fluid guide surfaces formed in said male mold, wherein said fluid guide surfaces apply the fluid blown out from said nozzles to desired areas on said sheet-like surface member for the period from the time when the male mold is pressed against said sheet-like surface member secured by said clamping devices to the time when the sheet-like surface member is drawn to extend along said concave die surface, when said male mold and said female mold are closed.

The fourth aspect of the present invention is a plastic laminated article characterized in that a sheet-like surface member made of a single layer structure of a thermoplastic elastomer, and a synthetic resin backing material layer made of the materials having a compatibility with said surface member and integrated with the reverse side of said surface member by thermal melting.

According to the first aspect of the present invention, the convex portion of the male mold keeps in contact with the laminating sheet while the laminating sheet is extended by the male mold. During this time, the heat transfer between the laminating sheet and the male mold is effected due to the heat gradient therebetween. In other words, the spontaneous transfer of thermal energy is effected from the heated laminating sheet to the male mold through the contact area created between the laminating sheet and a convex portion of the male mold, so that the temperature of the contact area of the laminating sheet becomes lower than the temperature of the peripheral region of the contact area of the laminating sheet.

When the convex portion of the male mold is brought into contact with the laminating sheet during the process of heating the laminating sheet, both the laminating sheet and the convex portion of the male mold are heated at the same time. In this instance, however, the temperature of the male mold can be kept lower than the temperature of the laminating sheet, because the amount of heat capacity of the male mold is far larger than that of the laminating sheet. Therefore, the heat gradient between the male mold and the laminating sheet is maintained in this instance, so that the temperature of the laminating sheet in the area of contact with the convex portion of the male mold can be kept lower than the temperature of the peripheral region of the contact area of the laminating sheet.

When the convex portion of the male mold is in contact with the laminating sheet, hot gas or hot air cannot be directly applied to the contact area created between the convex portion of the male mold and the laminating sheet. Therefore, the rate of temperature rise in the contact area of the laminating sheet can be lowered in comparison with the rate of temperature rise in the peripheral region of the contact area of the laminating sheet.

During the heating process, therefore, the tensile strength of the contact area of the laminating sheet is kept higher than the tensile strength of the peripheral resign of the contact area of the laminating sheet, so that the contact area of the laminating sheet is "hard to stretch" compared with other regions of the laminating sheet.

Consequently, the present invention can prevent the convex portion of the male mold from causing damage to the contact area of the laminating sheet, such as a reduction in thickness and a fracture of the laminating sheet, in the process of pressing the contact area of the laminating sheet with the convex portion of the male mold so as to extend the laminating sheet along the molding surface of the female mold.

The laminating sheet that has been extended along the molding surface of the female mold is subjected to a process of vacuum forming in which the laminating sheet is closely attached to the molding surface of the female mold by negative pressure supplied to suction ports in the female mold. In order to improve the accuracy of vacuum forming and obtain a laminated article of high quality, the laminating sheet must be closely attached to the bottom part or the deepest portion of the recessed area of the female mold by the suction force generated in the suction ports. When a laminating sheet that has been uniformly heated over all areas of the laminating sheet is vacuumed up against the female mold that has openings of suction ports at the bottom part or the deepest portion of the recessed area of the female mold, the thickness of the laminating sheet is, as a general rule, gradually decreasing toward the bottom part or the deepest portion of the recessed area of the female mold. Consequently, the laminating sheet becomes unequal in thickness and might suffer damage such as fractures and perforations depending on conditions. This is because the laminating sheet is continuously drawn from the shallower portion to the deeper portion of the recessed area in the female mold, so that the laminating sheet is sequentially brought into contact with the surface of the recessed area and is concurrently stretched in the direction of the suction ports at the bottom part or the deepest portion of the recessed area. According to the present invention, however, the thickness of the laminating sheet can be kept substantially equal over all areas of the laminating sheet, even in the area where the laminating sheet extends along the bottom part or the deepest portion of the recessed area of the female mold. This is because the convex portion of the male mold created a low-temperature "hard-to-stretch" area in the laminating sheet when the ridge of the convex portion of the male mold pressed the laminating sheet into the bottom part or the deepest portion of the female mold. Therefore, the present invention can prevent the patterns such as embossed designs and pictures disposed on the laminating sheet from being deformed at the bottom part or the deepest portion of the recessed area in the molding surface of the female mold.

According to the first aspect of the present invention, it is possible to determine the time to start a process for heating the laminating sheet and the time to end the process arbitrarily. Furthermore, it is also possible to restart the process for heating the laminating sheet after the end of the heating process of the laminating sheet. Thereby, taking into consideration the materials of the laminating sheet and the shape of the molding surface, the laminating sheet can be formed and shaped at the optimal temperature. Furthermore, the process of vacuum forming could be carried out immediately after the closure of the molds, if the temperature of the laminating sheet is adjusted to become the temperature suitable for the vacuum forming at the time that the male mold has been closed against the female mold. Thereby, the productivity of the laminated article according to the present invention can be improved moreover. If the temperature of the laminating sheet can't help lowering below the temperature suitable for the vacuum forming at the time that the molds have been closed, due to the properties such as the material and the thickness of the laminating sheet, the equal productivity of the laminated article according to the present invention can be attained by preheating the female mold with use of a conventional heating device.

A second aspect of the present invention resides in that a convex portion of a male mold is brought into contact with a laminating sheet before heating the laminating sheet. In other words, a convex portion of a male mold is brought into contact with a cold laminating sheet and then a process of heating a laminating sheet is commenced under a situation where a convex portion of a male mold is in contact with a cold laminating sheet. Since the contact area created between the laminating sheet and the convex portion of the male mold is not subjected to hot gas or hot air, the contact area of the laminating sheet gradually increase temperature from the cold laminating sheet. Consequently, the contact area of the laminating sheet in the second aspect of the present invention is lower in temperature than that of the fist aspect of the present invention when the contact area of the laminating sheet is pushed toward the bottom part of the recessed area of the female mold by the ridge of the convex portion of the male mold. In addition to the aforementioned advantages produced from the first aspect of the present invention, therefore, the second aspect of the present invention can prevent the laminating sheet from being fractured or deformed by the ridge of the convex portion of the male mold even if the convex portion is designed to protrude to a relatively large extent.

The third aspect of the present invention is an apparatus for producing a laminated article of synthetic resin, which allows heating a laminating sheet in a variety of heating modes during a process of closing a male and female molds. According to the present invention, a jet of hot gas or hot air squirted out of a heating nozzle is flown along a hot gas deflection surface and surely applied to the laminating sheet during a process of closing the molds, so that the laminating sheet can be heated and stretched, simultaneously. Thereby, the productivity of the laminated article can be improved by the apparatus according to the present invention.

Since closing the molds causes a relative movement between the heating nozzle and the hot gas deflection surface of the male mold, in the present invention, the hot gas deflection surface can be configured to change the flow direction of hot gas continuously as a process for closing the molds is progressing so that the area of the laminating sheet to which the hot gas is applied is shifted continuously. For example, it is possible to configure the hot gas deflection surface to direct hot air toward a central area of the laminating sheet at the beginning of the process for closing the molds and to deflect hot air gradually in the direction of a peripheral area of the laminating sheet as the process for closing the molds are progressing. If a peripheral area of the laminating sheet is heated intensively to stretch easily at the end of the process for closing the molds, a central area of the laminating sheet can be prevented from being damaged, ruptured or thin-walled. In addition, the process for intensively heating a peripheral area of the laminating sheet further improves the integrity of the laminating sheet and a base layer of a laminated article so that the laminated article does not cause delamination and other problems after the laminated article is molded.

The fourth aspect of the present invention is a laminated article of synthetic resin, wherein the laminating sheet is formed by a single layer structure and is directly integrated with the base layer of the laminated article by thermal bonding. No foam layer is arranged between the laminating sheet and the base layer, because a foam layer tends to cause delamination or material failure in a laminated article when tensile stress or bending stress is generated in a laminated article having a foam layer. Thereby, a high impact resistant laminated article of synthetic resin can be obtained according to the present invention. In addition, the laminating sheet is made of thermoplastic elastomer having high elasticity and there is little possibility that the laminating sheet of the article is damaged, even if the base layer is destroyed by impactive force. Therefore, the laminating sheet covering a broken base layer can prevent the damaged portion of the base layer from penetrating through and protruding from the laminating sheet. Furthermore, the laminated article according to the present invention consists of two layers, that is, a base layer and a layer of a laminating sheet and, comparing to a laminated structure having three or more layers, the effects of expansion and constriction of layers as a result of temperature changes are limited to those caused by two layers. In other words, a laminated article according to the present invention consists of two layers, that is, at most two kinds of resin materials, to facilitate the adjustment and prevention of the deformation or warpage that is caused in the laminated article due to the difference of coefficient of linear thermal expansion between the two kinds of resin materials. Furthermore, the laminated article according to the present invention is provided with a top surface of adequate softness of touch due to the elasticity of thermoplastic elastomer of the laminating sheet, and the laminated article according to the present invention can be recycled by crushing the laminated article as a whole provided that the laminating sheet and the basis layer are made from the materials that are compatible with each other.

BRIEF DESCRIPTION OF THE DRAWINGS

Some of the features and advantages of the invention having been generally described, others will become apparent from the description which follows, and from the accompanying drawings, in which:

FIG. 10 is a graph showing the results of Dupont impact test performed on a synthetic resin laminated body.

DETAILED DESCRIPTION OF THE INVENTION

The production method and apparatus according to the present invention is suitable for the mass production of laminated products of synthetic resin, such as a meter visor for vehicles that consists of a plastic backing material with the requisite rigidity and a sheet-like surface member such as a decorative sheet. In order to find optimum conditions for processing the sheet-like surface member to be used, on the occasion when such mass-production items are manufactured, temperature changes in the area where a salient of a male mold is pressed against the sheet-like surface member are measured by a sensor, for example, by a temperature sensor embedded in a molding surface of the salient of the male mold, while various closing motions of the molds are carried out under various heating conditions. A heater for supplying hot fluid and an actuator for driving the molds are controlled on the basis of the data obtained in such a way and thereby the sheet-like surface member is processed and molded adequately. When conditions for processing the plastic backing material that is injected on a backside of a vacuum-molded sheet-like surface member are determined, the laminated products of synthetic resin can be manufactured under same conditions as far as they are made from same materials and shaped into same configurations. In addition, in order to provide impact resistance to the laminated products of synthetic resin according to the present invention, the sheet-like surface member is preferably 0.35 mm or more in thickness if the laminated product according to the present invention is 3.5 mm in thickness including the sheet-like surface member.

First Embodiment

Figure 1:
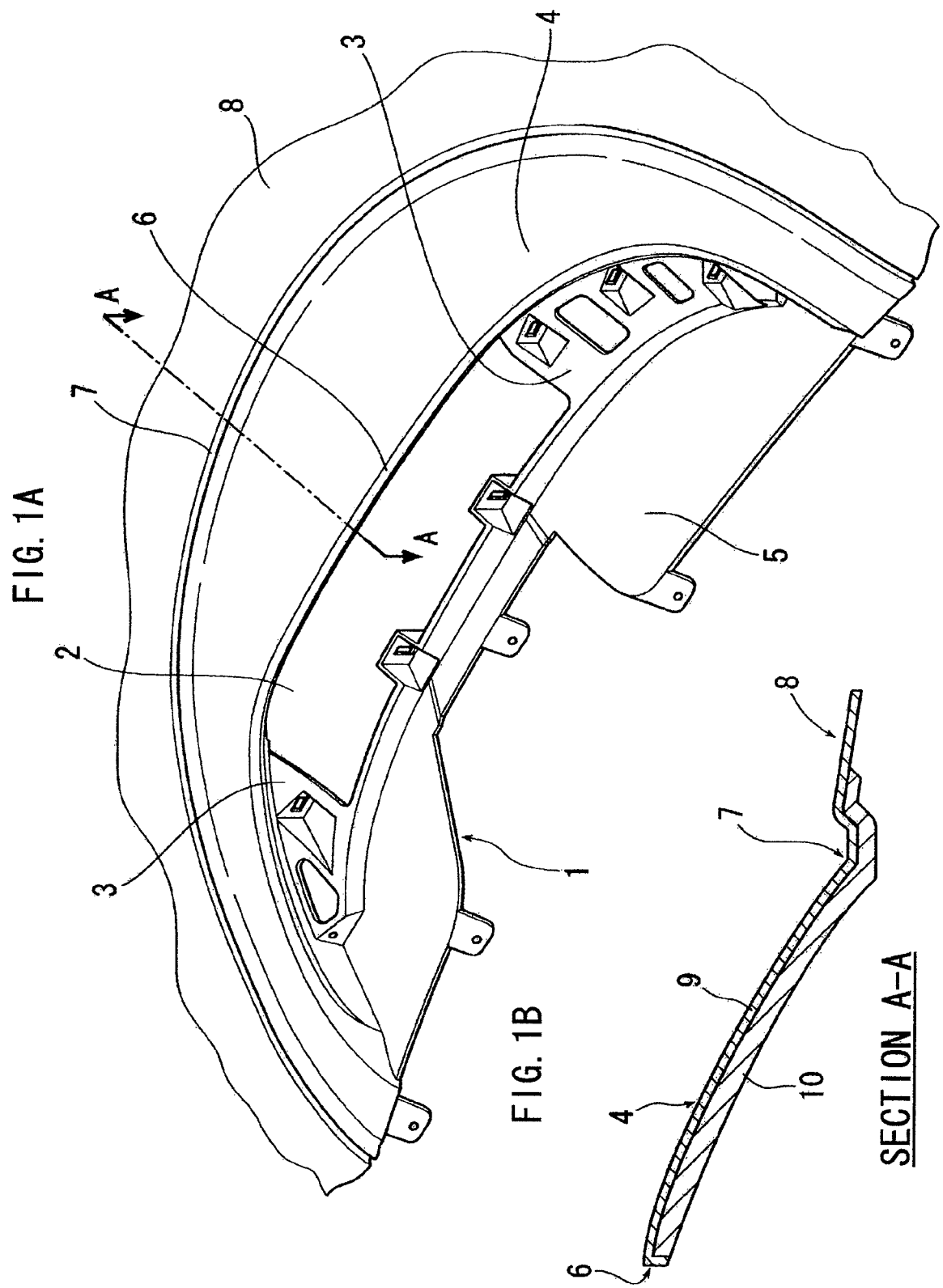
FIG. 1A shows a perspective view of a meter visor for vehicles, which is illustrated as one example of a laminated article of synthetic resin that is manufactured by the method and apparatus according to the present invention.
FIG. 1B shows a schematic cross-sectional view of the meter visor illustrated in FIG. 1A, which is taken along a line B-B in FIG. 1A.

FIG. 1A shows a perspective view of a meter visor for vehicles 1, which is drawn as though looking from the obverse side. The meter visor 1 comprises a sloping portion 3 in which an opening 2 is formed to install meters etc., a raised portion 4 extending over the sloping portion 3, and a deck portion 5 extending from the lower edge of the sloping portion 3 to project toward a vehicle driver. The raised portion 4 comprises an upper edge 6 extending along the sloping portion 3, a lower edge 7 extending along a windshield (not shown) of an automobile, and a convexly curved surface slanting from the upper edge 6 to the lower edge 7. A surplus portion 8, which is formed when the meter visor 1 is molded, extends in the outer rim of the lower edge 7.

As illustrated in FIG. 1B, the meter visor 1 is a laminated body that consists of a surface layer 9 made of a decorative sheet etc. and a backing material layer 10 made of a synthetic resin. The surface layer 9 is made of soft feel materials such as olefin-based thermoplastic elastomer (TPO). In addition, the backing material layer 10 is made of the materials, such as polypropylene resin (PP), which can be processed by injection molding. The backing material layer 10 provides an injection molded article with the requisite rigidity. The material of the backing material layer 10 has a compatibility with the surface layer 9. Furthermore, the surplus portion 8 and a surface layer 9 covering the opening 2 are removed from the meter visor 1 after the molding is completed.

FIG. 10 is a graph showing the results of Dupont impact test performed on a synthetic resin laminated body such as the meter visor 1 illustrated in FIG. 1B, wherein the impact test is performed at 0.35 mm, 0.75 mm, and 1.2 mm of the wall thickness of the surface layer 9, on condition that the thickness of the synthetic resin laminated body including the wall thickness of the surface layer 9 is 3.5 mm, and that the synthetic resin laminated body consists of the surface layer 9 having a single layer structure of thermoplastic elastomer and the synthetic resin backing material layer 10 made of the materials having a compatibility with the surface layer 9. FIG. 10 also shows the result of Dupont impact test performed at 0.0 mm of the wall thickness on a sample wherein the wall thickness of the synthetic resin backing material layer 10 is 3.5 mm and the surface layer 10 is not laminated. The Dupont impact tests were performed under the circumstances of −30° C.

As shown in FIG. 10, the above test results represent that the synthetic resin laminated body having no surface layer 9 is lowest in impact tenacity and the degree of impact tenacity of the synthetic resin laminated body increases as the wall thickness of the surface layer 9 increases. The table of FIG. 10 teaches that a sharp increase in the degree of impact tenacity cannot be expected at 1.2 mm and greater in wall thickness of the surface layer 9 because the degree of impact tenacity is substantially the same value in the range of 0.75 mm to 1.2 mm in wall thickness of the surface layer 9. Consequently, the upper value of the wall thickness of the surface layer 9 is preferably limited to 1.2 mm in view of the economical efficiency. On the other hand, the lower value of the wall thickness of the surface layer 9 is preferably limited to 0.35 mm in view of the commodity value, because the feel of the surface of the synthetic resin laminated body having a surface layer 9 that is less than 0.35 mm in wall thickness resembles that of the laminated body having no surface layer 9. As a result of the above impact test, it is noted that even if the backing material layer 10 is cracked, the surface layer 9 is neither damaged with cracks or chaps nor destroyed by the fractured part of the backing material layer 10 on condition that the wall thickness of the surface layer 9 is in the range of 0.35 mm to 1.2 mm, so that the fractured part of the backing material layer 10 was not revealed on the surface of the synthetic resin laminated body.

Second Embodiment

FIGS. 2-7 show an embodiment representing the production method and apparatus according to the present invention. Hereinafter, with reference to the drawings, the production method and apparatus of the present invention will be explained by taking a production of a meter visor 1 for example.

Figure 2:
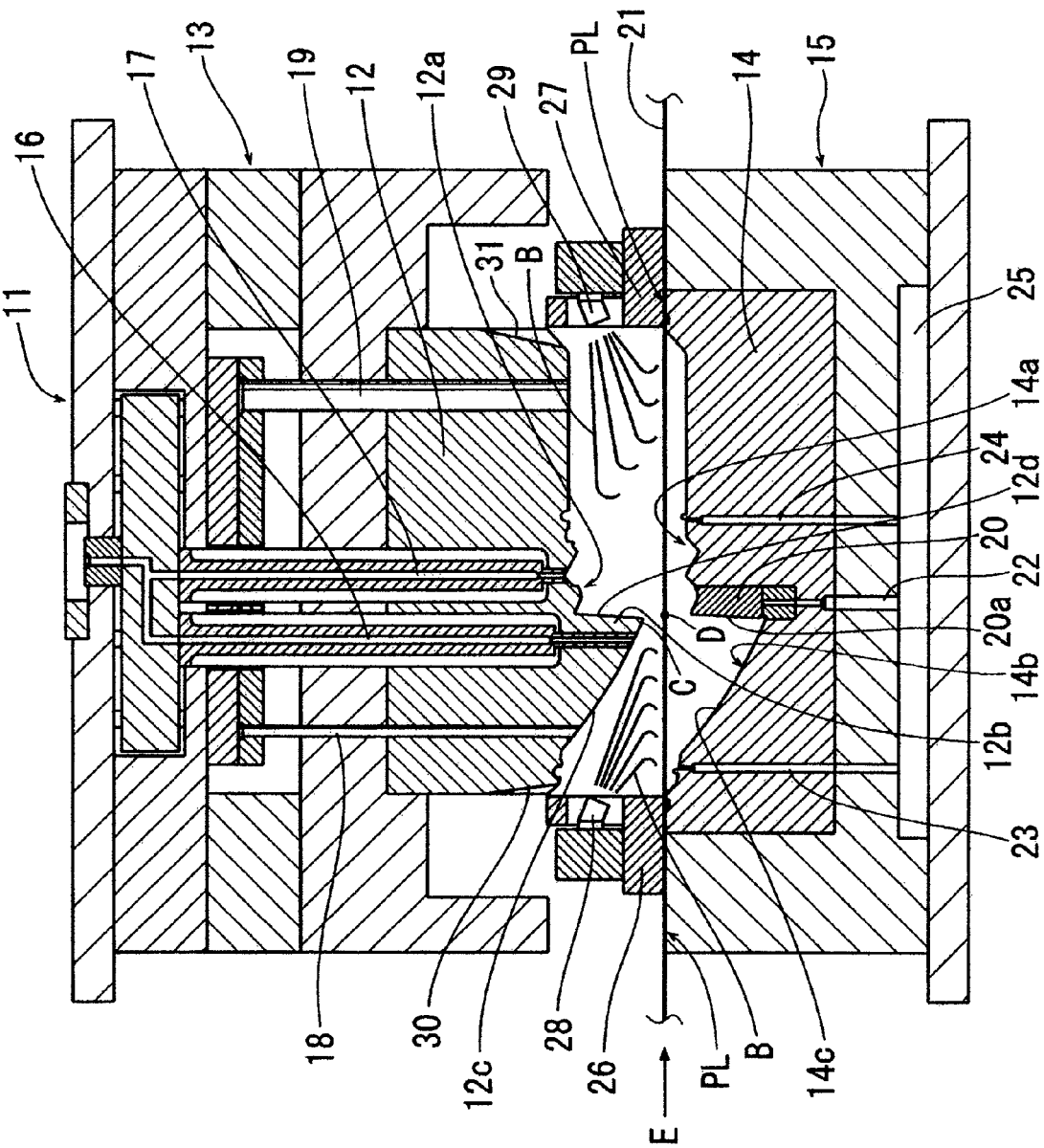
FIG. 2 shows a vertical cross-sectional view of an apparatus for manufacturing the meter visor of FIGS. 1A and 1B according to the present invention, wherein a laminating sheet that has been secured to the apparatus is heated before the start of closing molds.

As illustrated in FIG. 2, the apparatus 11 for manufacturing a synthetic resin laminated body comprises an upper base 13 carrying a male mold 12 and a lower base 15 carrying a female mold 14. The male mold 12 and the female mold 14 are placed opposite to each other and the male mold 12 can be reciprocated toward the female mold 14 together with the upper base 13 that is driven by an actuator (not shown). The die surface 12a of the male mold 12 has a salient 12b that is shaped to conform to the configuration of a reverse side of the raised portion 4 of the meter visor 1, while the die surface 14a of the female mold 14 has a concave portion 14b that is shaped to conform to the configuration of an obverse side of the raised portion 4 of the meter visor 1. When the male mold 12 is closed against the female mold 14, a cavity is formed between the die surfaces 12a and 14a. At this time, the salient 12b of the male mold 12 comes into the concave portion 14b of the female mold 14 so that a curved void for molding the raised portion 4 of the meter visor 1 is formed between a curved surface 12c of the salient 12b and a curved surface 14c of the concave portion 14b.

Resin flow channels 16, 17 for injection molding are formed in the male mold 12 and they extend from the upper base 13 to the die surface 12a of the male mold 12. The resin flow channel 16 opens in the curved surface 12c of the salient 12b and the other resin flow channel 17 opens in the flat part of the die surface 12a. Since a molten resin does not flow into the cavity portion corresponding to the opening 2 in the sloping portion 3 of the meter visor 1, the two resin flow channels 16, 17 are arranged so as to assure that a molten resin is filled in the cavities lying on either side of the sloping portion 3. A pair of ejector rods 18, 19 is attached to the male mold 12 and they also extend from the upper base 13 to the die surface 12a of the male mold 12. The apical ends of the ejector rods 18, 19 are revealed in the die surface 12a of the male mold 12 to form a part of the die surface 12a, respectively, and they project from the die surface 12a when removing a molded meter visor 1 from the molds 12, 14.

The female mold 14 has a block 20 that forms a part of the die surface 14a of the female mold 14 and a side wall 20a of the block 20 forms a part of the concave portion 14b. When the male mold 12 is closed against the female mold 14, a sheet-like surface member 21 that forms the surface layer 9 of the meter visor 1 is wedged in a gap between the side wall 20a of the block 20 and a side wall 12d of the male mold 12. Since the opening 2 of the meter visor 1 is formed at the position corresponding to the side wall 20a of the block 20, it is preferable that the molten resin injected from the resin flow channel 16, 17 does not flow into the gap between the side wall 20a of the block 20 and the side wall 12d of the male mold 12. The block 20 is detachably attached to the female mold 14 so as to replace the block 20 when the block 20 is worn away.

A vacuum port 22 for vacuum forming is formed at the lower edge of the side wall 20a of the block 20 in the female mold 14. Since the lower edge of the side wall 20a of the block 20 is located at the bottom of the concave portion 14b in the die surface 14a of the female mold 14, that is, at the deepest portion of the die surface 14a, the vacuum port 22 for vacuum forming opens at the deepest portion of the die surface 14a of the female mold 14. Vacuum ports 23, 24 for vacuum forming are also formed in the female mold 14. The vacuum port 23 for vacuum forming opens at the upper edge of the convex portion 14b of the female mold 14, that is, in the vicinity of the sallowest part, while the vacuum port 24 for vacuum forming opens at the position corresponding to the end edge of the deck portion 5 of the meter visor 1. Reference numeral 25 indicates an air suction path for evacuating air from the vacuum ports 22, 23, 24 for vacuum forming.

On a parting surface PL of the female mold 14, clamping devices 26, 27 each are located on either side of the die surface 14a of the female mold 14. The clamping devices 26, 27 are used to secure the sheet-like surface member 21 to the parting surface PL of the female mold 14. Nozzles 28, 29 for supplying hot fluid are fixed to the clamping devices 26, 27, respectively and the nozzles 28, 29 supply hot fluid B such as hot air between the die surface 12a of the male mold 12 and the die surface 14a of the female mold 14.

Fluid guide surfaces 30, 31 are formed in the side of the male mold 12. The fluid guide surfaces 30, 31 are configured to steer the hot fluid B blown out from the nozzles 28, 29 toward the sheet-like surface member 21 secured to the female mold 14 by means of the clamping devices 26, as the male mold 12 moves toward the female mold 14 and the fluid guide surfaces 30, 31 enter in a flow of the fluid blown out from the nozzles 28, 29. The fluid guide surfaces 30, 31 may be configured to be an inclined plane extending from an intermediate part in the side of the male mold 12 to the die surface 12a of the male mold 12.

Figure 3:
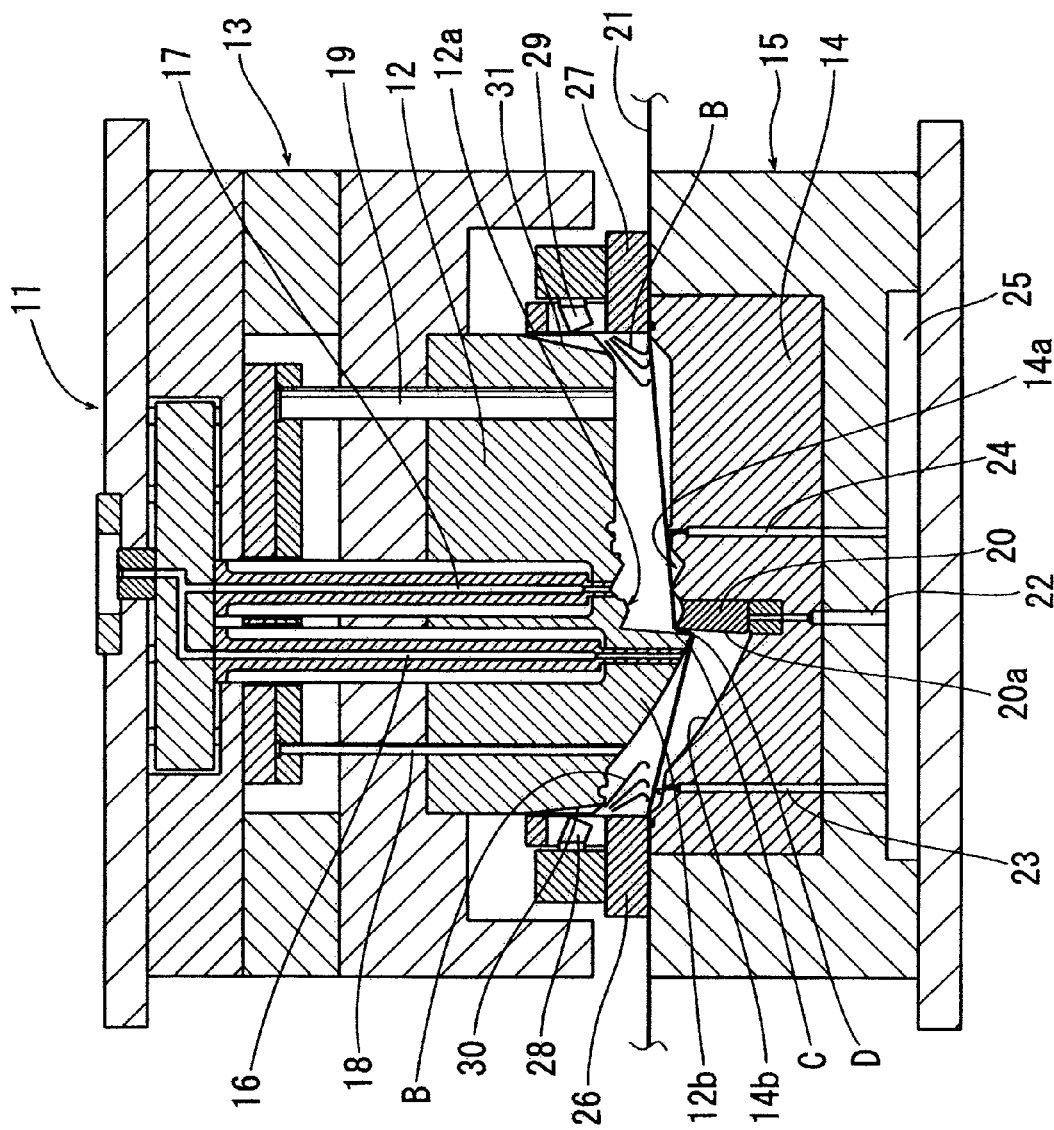
FIG. 3 shows a vertical cross-sectional view of the apparatus illustrated in FIG. 2, wherein the molds got started closing subsequent to the process of FIG. 2 and the laminating sheet is pressed with a convex portion of the male mold for stretching.

The configuration of the fluid guide surfaces 30, 31 is not limited to the inclined plane as illustrated in FIGS. 2 and 3. For example, the fluid guide surfaces 30, 31 may be configured to be a convex curve facing the nozzles 28, 29 or a concave curve caved toward the ejector rods 18, 19. When changing the configuration of the fluid guide surfaces 30, 31 variously, it is also possible to move the portion to be heated by the hot fluid in the sheet-like surface member 21 continuously, as the male and the female molds 12, 14 are closing. If the portion that will be heated by the hot fluid moves, for example, from the center of the sheet-like surface member 21 to the peripheral edge thereof as the male and the female molds 12, 14 are closing, a viscosity lowering of the sheet-like surface member 21, which will be caused at a contact area D against which a point C of the salient 12b of the male mold 12 is pressed, can be prevented and thereby, the thinning of the sheet-like surface member 21 and the fracture thereof can be prevented at the contact area D. If the fluid guide surfaces 30, 31 form a channel or channels having a constant depth, the contact area that will be heated by the hot fluid can be limited to a particular region of the sheet-like surface member 21.

Next, the method for manufacturing the meter visor 1 will be explained with reference to FIGS. 2-7. In the reference numerals used in FIGS. 2-7, the same reference numerals indicate the same component elements.

In FIG. 2, the sheet-like surface member 21 made of a TPO sheet etc., which forms the surface layer 9 of the meter visor 1 for vehicles, is fixed to the parting surface PL of the female mold 14 by means of the clamping devices 26, 27. The sheet-like surface member 21 is, for example, automatically wound off from a roll of the sheet-like surface member 21 and inserted between the male mold 12 and the female mold 14 from E direction in the figure. In this embodiment, heating of the sheet-like surface member 21 that is fixed to the parting surface PL of the female mold 14 is commenced by blowing off hot fluid B such as hot air from the nozzles 28, 29 before starting a step of closing the male mold 12 and the female mold 14. Thereby, the processing site of the sheet-like surface member 21 is entirely heated by the hot fluid B at a predetermined temperature during a predetermined time.

When the heating of the sheet-like surface member 21 is completed by the step illustrated in FIG. 2, the male mold 12 comes down as illustrated in FIG. 3 and the point C of the salient 12b formed in the die surface 12a of the male mold 12 is pressed against the contact area D of the sheet-like surface member 21. When the point C of the salient 12b of the male mold 12 is pressed against the contact area D of the sheet-like surface member 21, the temperature of the contact area D of the sheet-like surface member 21 gradually falls due to the thermal gradient between the salient 12b of the male mold 12 and the contact area D of the sheet-like surface member 21. Simultaneously, the contact area D of the sheet-like surface member 21 is not heated directly by the hot fluid B because the hot fluid B blown out from the nozzles 28, 29 is intercepted by the salient 12b of the male mold 12. During this time, the direction of jet flow of the hot fluid B is changed by the fluid guide surfaces 30, 31 in the side of the male mold 12 from the center of the sheet-like surface member 21 to the outer periphery (in the vicinity of the clamping devices 26, 27). Thereby, the temperature of the contact area D of the sheet-like surface member 21 is falling, while the temperature of the outer periphery of the sheet-like surface member 21 is rising continuously. When the temperature of the contact area D of the sheet-like surface member 21 falls to a predetermined temperature and the tensile strength of the contact area D of the sheet-like surface member 21 increases to a predetermined value, the male mold 12 is moved downwardly at a predetermined rate and is closed against the female mold 14.

When the male mold 12 is moved in the direction of the female mold 14 in FIG. 3, the sheet-like surface member 21 pressed by the point C of the salient 12b comes down and finally sinks down in the vicinity of the bottom of the concave portion 14b in the die surface 14a of the female mold 14, that is, in the vicinity of the deepest part of the die surface 14a. During this time, the contact area D of the sheet-like surface member 21 is pressed by the point C of the salient 12b of the male mold 12 downwards and thereby is subject to a tensile force continuously. However, the temperature of the contact area D of the sheet-like surface member 21 is kept lower than the temperature of the perimeter of the contact area D in the sheet-like surface member 21. During this time, the outer periphery of the sheet-like surface member 21 is heated by the hot fluid B continuously. The tensile strength of the contact area D of the sheet-like surface member 21 is greater than the tensile strength of the perimeter of the contact area D in the sheet-like surface member 21 so that the contact area D of the sheet-like surface member 21 is hard to stretch. Consequently, the contact area D of the sheet-like surface member 21 does neither become small in wall thickness nor fracture when the male mold 12 is closed against the female mold 14. In addition, even if the surface of the sheet-like surface member 21 is patterned, the pattern in the vicinity of the contact area D of the sheet-like surface member 21 does not become deformed. Since the tensile strength of the outer periphery of the sheet-like surface member 21 is lower than the tensile strength of the contact area D, the outer periphery stretches when the male mold 12 is closed against the female mold 14. However, the outer periphery of the sheet-like surface member 21 is a surplus portion that does not constitute a product of the meter visor 1 for vehicles. Therefore, the quality of the meter visor 1 for vehicles does not deteriorate even if the surplus portion becomes small in wall thickness.

Figure 4:
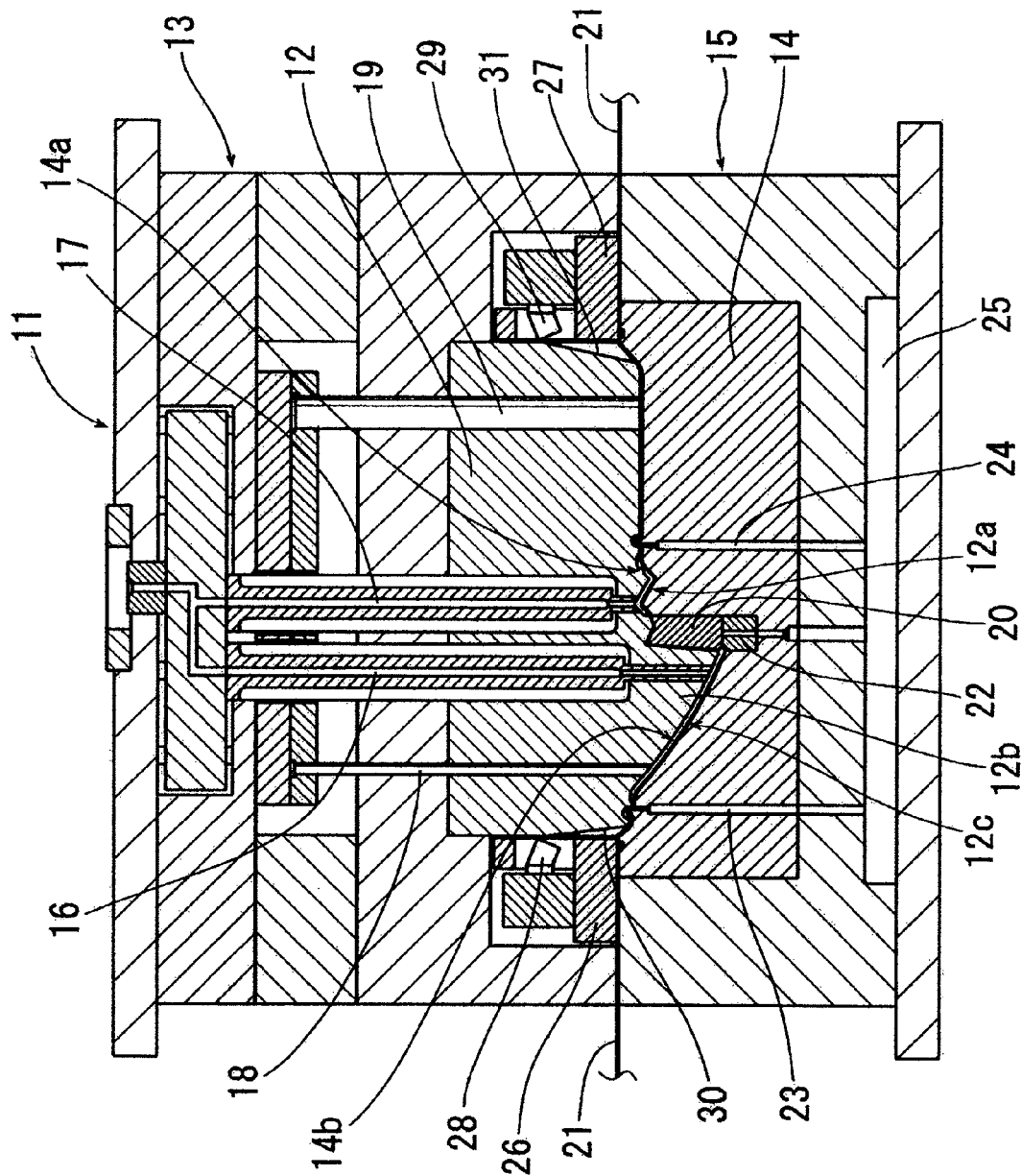
FIG. 4 shows a vertical cross-sectional view of the apparatus illustrated in FIG. 3, wherein the molds were closed subsequent to the process of FIG. 3 and the laminating sheet stretched onto the molding surface of the female mold is held against the molding surface of the female mold by vacuum forming.

When the male mold 12 and the female mold 14 are closed as illustrated in FIG. 4, the blow off of the hot fluid from the nozzles 28, 29 is stopped and the sheet-like surface member 21 extends along the die surface 14a of the female mold 14 and lies in the space defined by the die surface 12a of the male mold 12 and the die surface 14a of the female mold 14. At this time, the sheet-like surface member 21 is wedged between the side wall 20a of the block 20 and the side wall 12d of the male mold 12 and there is no space between the side wall 20a of the block 20 and the side wall 12d of the male mold 12 (refer to FIG. 2). In the outer part of the die surface 12a of the male mold 12 and in the outer part of the die surface 14a of the female mold 14, the sheet-like surface member 21 is also wedged between the male mold 12 and the female mold 14 (refer to FIG. 4). Under the circumstances, evacuation of air is carried out through the vacuum ports 22, 23, 24 for vacuum forming and thereby, the sheet-like surface member 21 that lies in the space defined by the die surface 12a of the male mold 12 and the die surface 14a of the female mold 14 is vacuum formed against the die surface 14a of the female mold 14. At this time, the contact area D of the sheet-like surface member 21 that was pressed into the bottom portion or the deepest portion of the concave portion 14b of the female mold 14 by the point C of the salient 12b of the male mold 12 is low in temperature and high in tensile strength and hard to stretch. Therefore, even if the sheet-like surface member 21 is elongated sequentially in touch with the die surface 14a from a wall surface in the shallow zone of the die surface 14a of the female mold 14 toward the vacuum port 22 in the bottom or the deepest portion of the concave portion 14b, the wall thickness of the sheet-like surface member 21 is kept substantially even or uniform. In addition, when this vacuum forming is carried out, the sheet-like surface member 21 can be heated to a predetermined temperature by a heating device (not shown) attached to the female mold 14, if desired.

Figure 5:
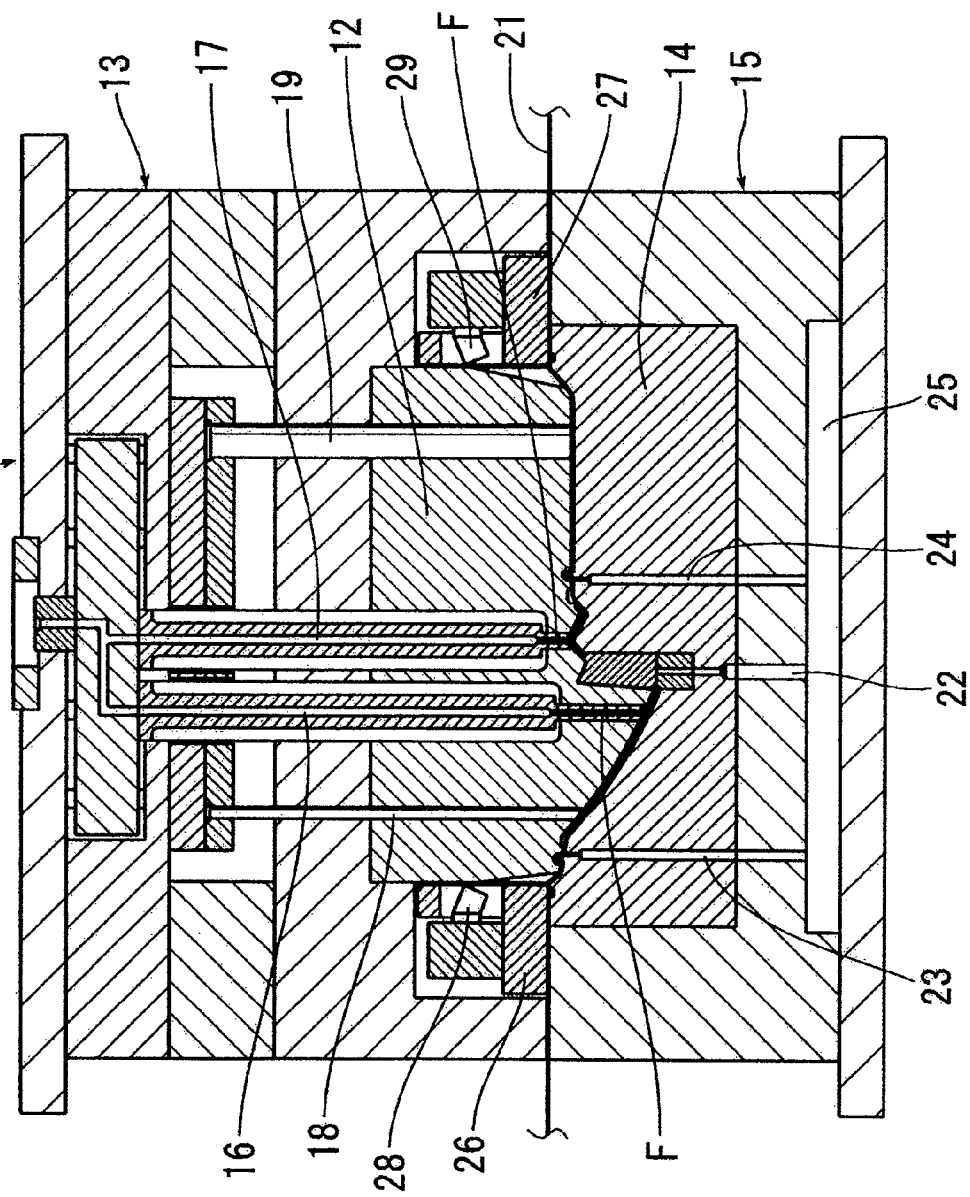
FIG. 5 shows a vertical cross-sectional view of the apparatus illustrated in FIG. 4, wherein molten resin is injected into a cavity that is defined between the laminating sheet, which is held against the molding surface of the female mold through the process of FIG. 4, and the molding surface of the male mold, to form a base layer laminated with the laminating sheet.
Figure 6:
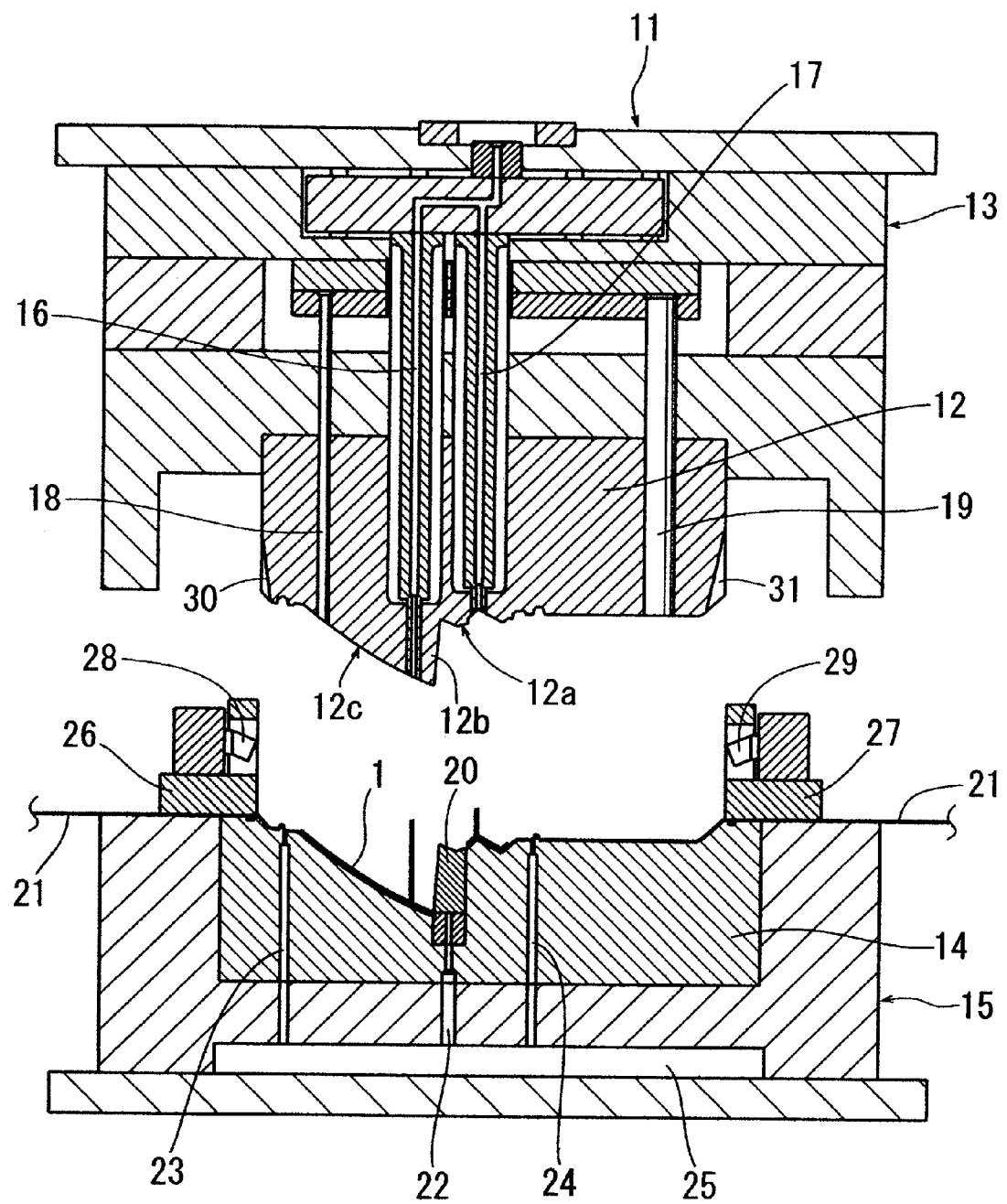
FIG. 6 shows a vertical cross-sectional view of the apparatus illustrated in FIG. 6, wherein the male mold is lifted to a position where a molded meter visor is released subsequent to the injection molding process of FIG. 5 and a process for cooling the molded meter visor.

When the vacuum forming of the sheet-like surface member 21 is completed, the sheet-like surface member 21 is attached firmly to the die surface 14b of the female mold 14 and cavities are defined between the reverse side of the sheet-like surface member 21 and the die surface 12a of the male mold 12. As illustrated in FIG. 5, a molten resin F is injected into the cavities through the resin flow channels 16, 17 and fills up the cavities with the molten resin F. The injected molten resin F forms the backing material layer 10 laminated on the sheet-like surface member 21 (the surface layer 9) (refer to FIG. 1B). Next, the backing material layer 10 integrated with the sheet-like surface member 21 is cooled down while the male mold 12 and the female mold 14 are closed against each other. When the cooling is completed, the ejector rods 18, 19 are actuated to lift the male mold 12 to the mold-releasing position as illustrated in FIG. 6, if desired, and then the meter visor 1 is demolded from the female mold 14. The demolded meter visor 1 is subjected to a process for removal of a surplus portion such as a trimming process and further subjected to necessary work such as cutting.

Figure 7:
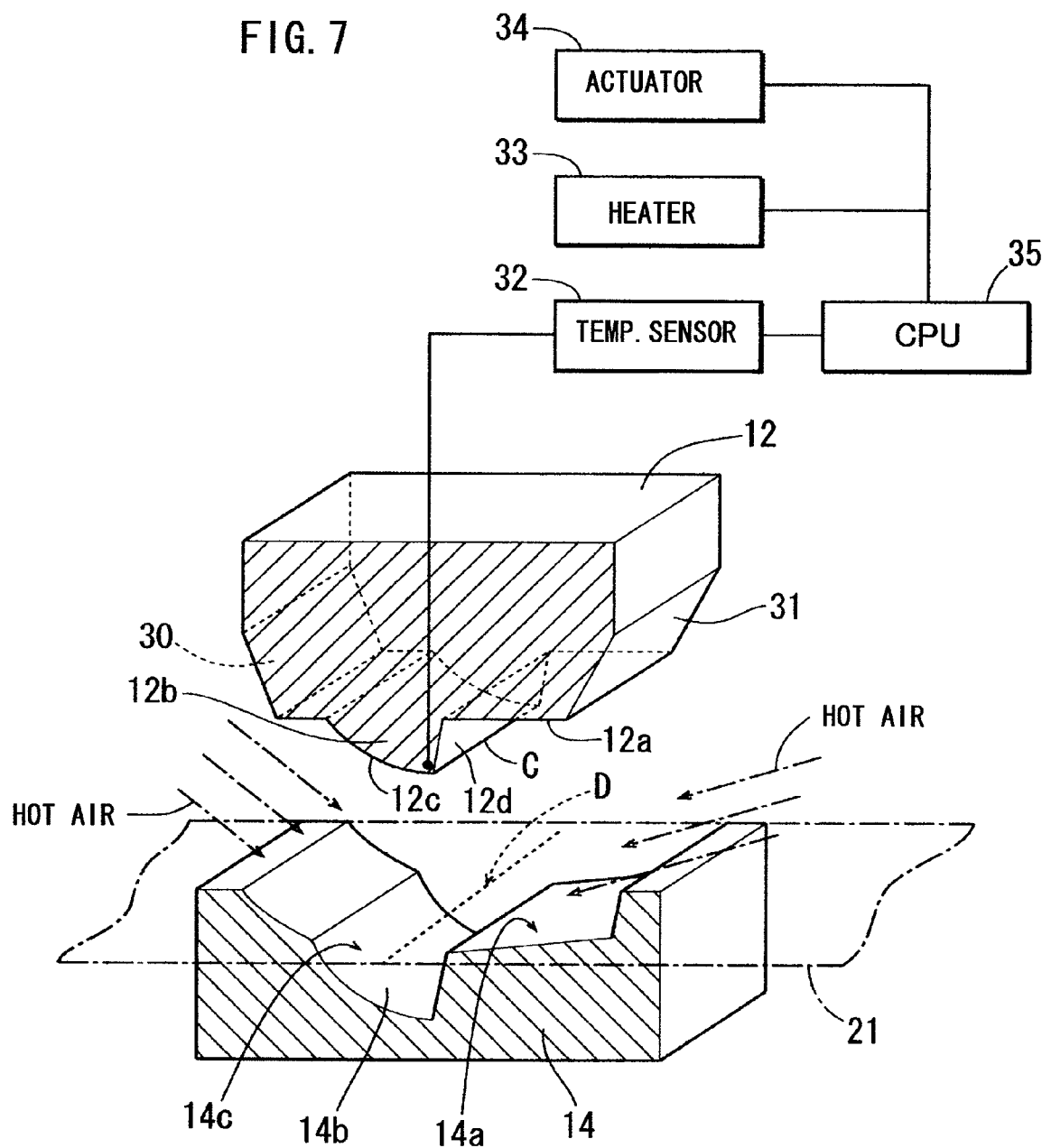
FIG. 7 shows a schematic diagram of a control system of the apparatus according to the present invention.

FIG. 7 shows a schematic diagram of control system for the manufacturing apparatus of the present invention. When putting the production method of the present invention in practice, it is necessary to preliminarily find out the optimum processing conditions for the sheet-like surface member 21 to be used in. The optimum processing conditions vary according to the materials of the sheet-like surface member 21 to be used, and the shapes of the products to be manufactured etc. Consequently, as for specific products such as a meter visor 1 for vehicles, various closing motions of the molds are preliminarily carried out under various heating conditions and while those mold closing motions are carried out, temperature changes of the contact area D where the salient 12b of the male mold 12 is pressed against the sheet-like surface member 21 are measured, for example, by a temperature sensor 32 embedded in the salient 12b of the die surface 12a of the male mold 12. Then, on the basis of the data obtained in such a way, the heater 33 for supplying hot fluid and the actuator 34 for driving the male mold 12 are controlled to process the sheet-like surface member 21. For example, the temperature of the contact area D of the sheet-like surface member 21 can be determined by comparing and considering the degree of adhesion between the salient 12b of the male mold 12 and the sheet-like surface material 21 and the degree of defectiveness existing in the contact area D of the sheet-like surface member 21. In addition, the temperature of the contact area D of the sheet-like surface member 21 can be adjusted by controlling a rate of closing the male mold 12 and the female mold 14. Furthermore, if the materials of a plastic baking material that is injected on a rear surface of a vacuum-formed sheet-like surface member 21 and the conditions for processing the plastic backing material are determined, and if the production apparatus 1 of the present invention is controlled by CPU 35 etc. on the basis of those data determined in such a way, the same laminated products of synthetic resin can be manufactured under the same conditions as far as the laminated products are made from the same materials and shaped into the same configurations.

Third Embodiment

Figure 8:
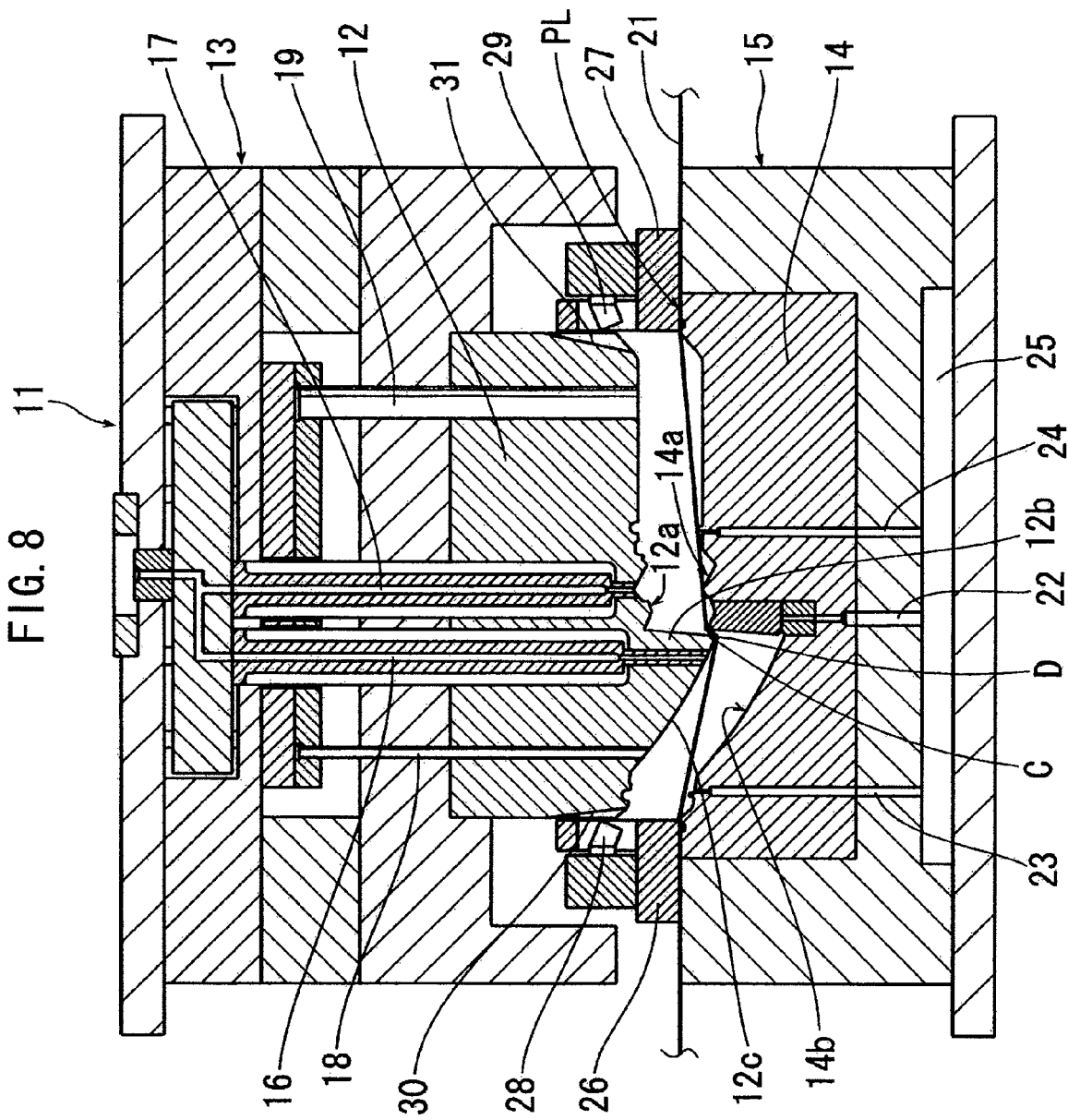
FIG. 8 shows a vertical cross-sectional view of the apparatus according to the present invention, wherein a modified process for manufacturing a laminated article of synthetic resin is performed in accordance with the present invention, which is characterized in that a convex portion of a male mold is brought into contact with a laminating sheet, subsequent to a process for securing the laminating sheet between the molds, but prior to a start of heating the laminating sheet.
Figure 9:
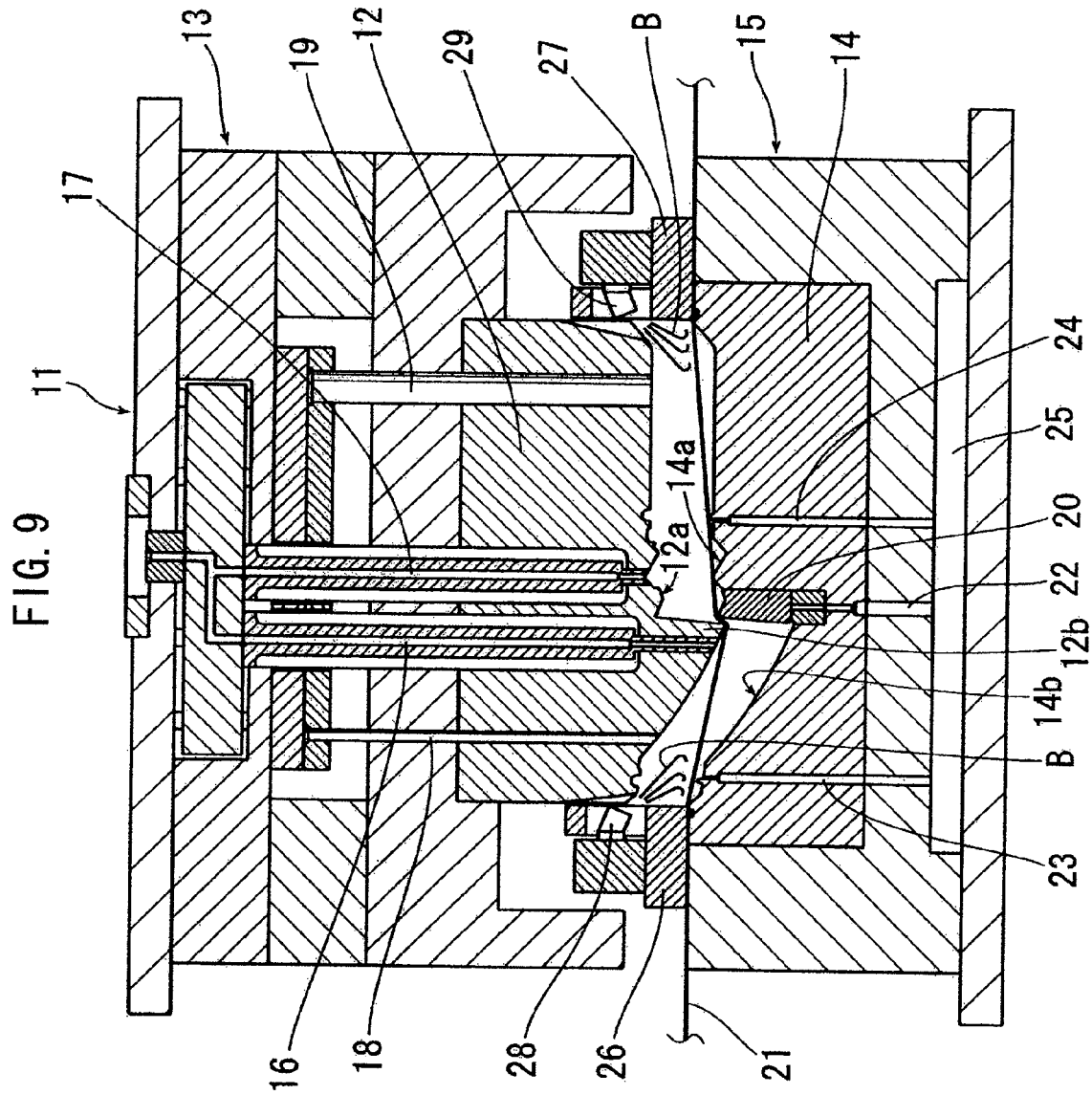
FIG. 9 shows a vertical cross-sectional view of the apparatus illustrated in FIG. 8, wherein a process for heating the laminating sheet is started after a convex portion of a male mold is brought into contact with a laminating sheet.

FIGS. 8 and 9 show another embodiment of the production method and apparatus according to the present invention. In FIGS. 1-9, the same reference numeral indicates the same constituent element. The features of this embodiment reside in that the sheet-like surface member 21 is secured to the parting surface PL of the female mold 14 by the clamping devices 26, 27 and then, the point C of the salient 12b of the male mold 12 is pressed against the contact area D of the sheet-like surface material 21 while the sheet-like surface member 21 is in cold condition, as illustrated in FIG. 8; and then, hot fluid (hot air) B is blown off from the nozzles 28, 29 to start heating the sheet-like surface member 21, as illustrated in FIG. 9. The contact area D of the sheet-like surface member 21 is not subjected to the hot fluid B directly, according to this embodiment, because the hot fluid B is supplied after the point C of the salient 12b of the male mold 12 is pressed against the contact area D of the sheet-like surface member 21, following commencement of mold closing action. Consequently, it is easy to moderate a rise of temperature in the contact area D of the sheet-like surface member 21 as compared with the first embodiment of the present invention. Therefore, in those instances where a raised portion of the product to be produced protrudes by a large margin and any defects such as a fracture of a sheet or an elongation of patterns may be occurred in the contact area D of the sheet-like surface member 21, the production method of this embodiment may be useful. Other constituents of this embodiment are the same as those of the first embodiment of the present invention.

The production method and apparatus of the present invention can typically be applied to a manufacture of interior parts for vehicles, which is made of a laminate consisting of a surface layer made of soft feel materials such as olefin-based thermoplastic elastomer (TPO) and a plastic backing material with the requisite rigidity. However, the production method and apparatus of the present invention can be applied extensively to a manufacture of a plastic laminated body having a relatively large concavity and convexity, without being limited to a manufacture of interior parts for vehicles. In addition, the plastic laminated articles produced by the present invention can typically be used as interior parts for vehicles such as a meter visor, however, in view of the degree of impact resistance, the margin of safety when the plastic backing layer is fractured, the tolerance of temperature changes due to two-layer structure composed of similar resin materials, and the recycling efficiency, the application of the plastic laminated articles is not limited to interior parts for vehicles and is superior in general versatility.

The invention claimed is:

1. A method of manufacturing a plastic laminated article having a raised portion on a surface of the plastic laminated article, the method comprising:
arranging and securing a sheet of a thermoplastic synthetic resin between a die surface of a female mold, which has a concave portion accommodating an obverse side profile of the raised portion, and a die surface of a male mold, which has a convex portion accommodating a reverse side profile of the raised portion;
heating the sheet by blowing a heated fluid onto the sheet through at least one nozzle located at at least one of the female and male molds;
relatively moving the female mold and the male mold in a closing direction of the female and male molds and, without closing the female mold against the male mold, pressing the convex portion of the male mold against the sheet to create an area of contact between the convex portion of the male mold and the sheet, drawing the sheet with the convex portion of the male mold so that part of the sheet extends along the die surface of the female mold, and, simultaneously, controlling the blowing of the heated fluid onto the sheet by commencing closing of the female mold and the male mold after starting the blowing of the heated fluid onto the sheet to provide a thermal gradient between the convex portion of the male mold and the sheet so that the sheet has a lower temperature and a higher tensile strength in the area of contact than in an area surrounding the area of contact;
closing the female mold against the male mold, while blowing the heated fluid onto the sheet, to define a cavity for vacuum forming between the die surface of the female mold and the die surface of the male mold, and vacuum forming the sheet, which extends in the cavity for vacuum forming, against the die surface of the female mold, thereby attaching the sheet to the die surface of the female mold and defining a cavity for injection molding between the sheet and the die surface of the male mold; and
injecting a molten resin into the cavity for injection molding and forming a backing material layer of the resin laminated on the sheet.

2. A method of manufacturing a plastic laminated article having a raised portion on a surface of the plastic laminated article, the method comprising:
arranging and securing a sheet of a thermoplastic synthetic resin between a die surface of a female mold, which has a concave portion accommodating an obverse side profile of the raised portion, and a die surface of a male mold, which has a convex portion accommodating a reverse side profile of the raised portion;
heating the sheet by blowing a heated fluid onto the sheet through at least one nozzle located at at least one of the female and male molds;
relatively moving the female mold and the male mold in a closing direction of the female and male molds and, without closing the female mold against the male mold, pressing the convex portion of the male mold against the sheet to create an area of contact between the convex portion of the male mold and the sheet, drawing the sheet with the convex portion of the male mold so that part of the sheet extends along the die surface of the female mold, simultaneously controlling the blowing of the heated fluid onto the sheet by commencing closing of the female mold and the male mold before starting the blowing of the heated fluid onto the sheet, to provide a thermal gradient between the convex portion of the male mold and the sheet so that the sheet has a lower temperature and a higher tensile strength in the area of contact than in an area surrounding the area of contact, and blowing the heated fluid onto the sheet after the convex portion of the male mold is pressed against the sheet to create the area of contact between the convex portion of the male mold and the sheet;
closing the female mold against the male mold to define a cavity for vacuum forming between the die surface of the female mold and the die surface of the male mold, and vacuum forming the sheet, which extends in the cavity for vacuum forming, against the die surface of the female mold, thereby attaching the sheet to the die surface of the female mold and defining a cavity for injection molding between the sheet and the die surface of the male mold; and
injecting a molten resin into the cavity for injection molding and forming a backing material layer of the resin laminated on the sheet.

3. The method as recited in claim 2, including closing the female mold and the male mold while blowing the heated fluid onto the sheet.

4. The method as recited in claim 2, including closing the female mold and the male mold after stopping the blowing of the heated fluid onto the sheet.

5. A method of manufacturing a plastic laminated article having a raised portion on a surface of the plastic laminated article, the method comprising:
arranging and securing a sheet of a thermoplastic synthetic resin between a die surface of a female mold, which has a concave portion accommodating an obverse side profile of the raised portion, and a die surface of a male mold, which has a convex portion accommodating a reverse side profile of the raised portion;
heating the sheet by blowing a heated fluid onto the sheet through at least one nozzle located at at least one of the female and male molds;
relatively moving the female mold and the male mold in a closing direction of the female and male molds and, without closing the female mold against the male mold, pressing the convex portion of the male mold against the sheet to create an area of contact between the convex portion of the male mold and the sheet, drawing the sheet with the convex portion of the male mold so that part of the sheet extends along the die surface of the female mold, and, simultaneously, controlling the blowing of the heated fluid onto the sheet to provide a thermal gradient between the convex portion of the male mold and the sheet so that the sheet has a lower temperature and a higher tensile strength in the area of contact than in an area surrounding the area of contact;

closing the female mold against the male mold to define a cavity for vacuum forming between the die surface of the female mold and the die surface of the male mold, controlling the blowing of the heated fluid onto the sheet by deflecting the heated fluid from a center portion to a peripheral edge portion of the sheet while closing the male mold and the female mold, and vacuum forming the sheet, which extends in the cavity for vacuum forming, against the die surface of the female mold, thereby attaching the sheet to the die surface of the female mold and defining a cavity for injection molding between the sheet and the die surface of the male mold; and injecting a molten resin into the cavity for injection molding and forming a backing material layer of the resin laminated on the sheet.

6. A method of manufacturing a plastic laminated article having a raised portion on a surface of the plastic laminated article, the method comprising:

arranging and securing a sheet of a thermoplastic synthetic resin between a die surface of a female mold, which has a concave portion accommodating an obverse side profile of the raised portion, and a die surface of a male mold, which has a convex portion accommodating a reverse side profile of the raised portion;

after arranging and securing the sheet between the die surfaces of the female and male molds, relatively moving the female mold and the male mold in a closing direction of the female and male molds and, without closing the female mold against the male mold, pressing the convex portion of the male mold against the sheet to create an area of contact between the convex portion of the male mold and the sheet;

heating the sheet while the sheet is arranged and secured between the die surfaces of the female and male molds by blowing a heated fluid onto the sheet;

further moving the female mold and the male mold in the closing direction and drawing the sheet with the convex portion of the male mold so that part of the sheet extends along the die surface of the female mold, and, simultaneously, controlling the blowing of the heated fluid onto the sheet by commencing closing of the female mold and the male mold after starting the blowing of the heated fluid onto the sheet and the male mold so that, due to differences in heat capacities of the male mold and the sheet, the sheet has a lower temperature and a higher tensile strength in the area of contact than in an area surrounding the area of contact;

closing the female mold against the male mold, while blowing the heated fluid onto the sheet, to define a cavity for vacuum forming between the die surface of the female mold and the die surface of the male mold, and vacuum forming the sheet, which extends in the cavity for vacuum forming, against the die surface of the female mold, thereby attaching the sheet to the die surface of the female mold and defining a cavity for injection molding between the sheet and the die surface of the male mold; and injecting a molten resin into the cavity for injection molding and forming a backing material layer of the resin laminated on the sheet.

7. A method of manufacturing a plastic laminated article having a raised portion on a surface of the plastic laminated article, the method comprising:

arranging and securing a sheet of a thermoplastic synthetic resin between a die surface of a female mold, which has a concave portion accommodating an obverse side profile of the raised portion, and a die surface of a male mold, which has a convex portion accommodating a reverse side profile of the raised portion;

after arranging and securing the sheet between the die surfaces of the female and male molds, relatively moving the female mold and the male mold in a closing direction of the female and male molds and, without closing the female mold against the male mold, pressing the convex portion of the male mold against the sheet to create an area of contact between the convex portion of the male mold and the sheet;

heating the sheet while the sheet is arranged and secured between the die surfaces of the female and male molds by blowing a heated fluid onto the sheet;

further moving the female mold and the male mold in the closing direction and drawing the sheet with the convex portion of the male mold so that part of the sheet extends along the die surface of the female mold, simultaneously, controlling the blowing of the heated fluid onto the sheet by commencing closing of the female mold and the male mold before starting the blowing of the heated fluid onto the sheet, and the male mold so that, due to differences in heat capacities of the male mold and the sheet, the sheet has a lower temperature and a higher tensile strength in the area of contact than in an area surrounding the area of contact, and blowing the heated fluid onto the sheet after the convex portion of the male mold is pressed against the sheet to create the area of contact between the convex portion of the male mold and the sheet;

closing the female mold against the male mold to define a cavity for vacuum forming between the die surface of the female mold and the die surface of the male mold, and vacuum forming the sheet, which extends in the cavity for vacuum forming, against the die surface of the female mold, thereby attaching the sheet to the die surface of the female mold and defining a cavity for injection molding between the sheet and the die surface of the male mold; and injecting a molten resin into the cavity for injection molding and forming a backing material layer of the resin laminated on the sheet.

8. The method as recited in claim 7, including closing the female mold and the male mold while blowing the heated fluid onto the sheet.

9. The method as recited in claim 7, including closing the female mold and the male mold after stopping the blowing of the heated fluid onto the sheet.

10. A method of manufacturing a plastic laminated article having a raised portion on a surface of the plastic laminated article, the method comprising:

arranging and securing a sheet of a thermoplastic synthetic resin between a die surface of a female mold, which has a concave portion accommodating an obverse side profile of the raised portion, and a die surface of a male mold, which has a convex portion accommodating a reverse side profile of the raised portion;

after arranging and securing the sheet between the die surfaces of the female and male molds, relatively moving the female mold and the male mold in a closing direction of the female and male molds and, without closing the female mold against the male mold, pressing the convex portion of the male mold against the sheet to create an area of contact between the convex portion of the male mold and the sheet;

heating the sheet while the sheet is arranged and secured between the die surfaces of the female and male molds by blowing a heated fluid onto the sheet;

further moving the female mold and the male mold in the closing direction and drawing the sheet with the convex portion of the male mold so that part of the sheet extends along the die surface of the female mold, and, simultaneously, controlling the blowing of the heated fluid onto the sheet and the male mold so that, due to differences in heat capacities of the male mold and the sheet, the sheet has a lower temperature and a higher tensile strength in the area of contact than in an area surrounding the area of contact;

closing the female mold against the male mold to define a cavity for vacuum forming between the die surface of the female mold and the die surface of the male mold, controlling the blowing of the heated fluid to the sheet by deflecting the heated fluid from a center portion to a peripheral edge portion of the sheet while closing the male mold and the female mold, and vacuum forming the sheet, which extends in the cavity for vacuum forming, against the die surface of the female mold, thereby attaching the sheet to the die surface of the female mold and defining a cavity for injection molding between the sheet and the die surface of the male mold; and injecting a molten resin into the cavity for injection molding and forming a backing material layer of the resin laminated on the sheet.

* * * * *